United States Patent [19]

Böttle

[11] Patent Number: 5,535,032
[45] Date of Patent: Jul. 9, 1996

[54] OPTICAL PARALLEL-SERIAL CONVERTER AND OPTICAL SERIAL-PARALLEL CONVERTER

[75] Inventor: Dietrich Böttle, Salach, Germany

[73] Assignee: Alcatel N.V., Netherlands

[21] Appl. No.: 538,178

[22] Filed: Aug. 23, 1995

Related U.S. Application Data

[63] Continuation of Ser. No. 46,773, Apr. 13, 1993, abandoned.

[30] Foreign Application Priority Data

Apr. 15, 1992 [DE] Germany .......................... 42 12 603.7

[51] Int. Cl.$^6$ ...................................................... H04J 14/08
[52] U.S. Cl. ........................................... 359/140; 359/158
[58] Field of Search ................................... 359/114, 140, 359/115, 117, 124, 125, 135, 137, 138, 140, 158

[56] References Cited

U.S. PATENT DOCUMENTS

| | | | |
|---|---|---|---|
| 3,838,278 | 9/1974 | Duguay et al. | 359/140 |
| 3,849,604 | 11/1974 | Benes et al. | 359/140 |
| 4,855,999 | 8/1989 | Choa | 370/112 |
| 4,866,698 | 9/1989 | Huggins et al. | 359/115 |
| 4,893,306 | 1/1990 | Choa et al. | 370/94.2 |
| 4,961,621 | 10/1990 | Su | 385/16 |
| 5,032,010 | 7/1991 | Su | 385/16 |

FOREIGN PATENT DOCUMENTS

| | | | |
|---|---|---|---|
| 0047588 | 3/1985 | Japan | 359/140 |
| 0090443 | 5/1985 | Japan | 359/140 |
| 8605343 | 9/1986 | United Kingdom | 359/140 |
| 8800415 | 1/1988 | United Kingdom | 359/140 |

OTHER PUBLICATIONS

"16 Gbit/s Fiber Transmission Experiment Using Optical Time–Division Multiplexing" by R. S. Tucker et al. Electronics Letters, Nov. 19, 1987, vol. 23, No. 24, pp. 1270 and 1271.

"Photonic Switching Technologies For Terabit Communication Node" by K. Yukimatsu et al., NTT Review, Mar. 1991, vol. 3, No. 2, pp. 98–101.

"Signal Multiplexing And Demultiplexing System And Its Equipment" by Takaso Kazuto Japanese Patent Abstract of JP63056027 (Toshiba), Jul. 30, 1988, vol. 1, No. 2277, Group E640.

"Optical Time–Division Multiplexing For Very High Bit–Rate Transmission" by R. S. Tucker et al. Journal of Lightwave Technology, vol. 6, No. 11, Nov. 6, 1988, New York, USA, pp. 1737–1749.

"20 Gbit/s, 205 km Optical Time Division Multiplexed Transmission System" by G. E. Wickens et al. Electronics Letters, vol. 27, No. 11, May 23, 1991, Stevenage GB, pp. 973–974.

"49.Gbit/s Electroptic Demultiplexing Using Cascaded On/Off Gates. 641" by Masahiko Jinno IEEE Photonics Technology Letters, vol. 4, No. 6, Jun. 1, 1992, New York, USA, pp. 641–644.

(List continued on next page.)

*Primary Examiner*—Leslie Pascal
*Assistant Examiner*—Rafael Bacares
*Attorney, Agent, or Firm*—Ware, Fressola, Van Der Sluys & Adolphson

[57] ABSTRACT

The high transmission capacity of an optical transmission path (about 200,000 km Mbit/s) is used, among others, to couple several data sources and data sinks to an optical waveguide. The task of the invention is to ensure the coupling in and out of several data streams to or from any path section of a (predetermined) optical transmission path. This task is fulfilled by a device for the parallel-serial conversion, and a device for the serial-parallel conversion of the data streams to the optical transmission path. The coupling in and out of the individual data streams is performed by optical modulators or optical expanders, which are incorporated into the optical transmission path. Several data streams are parallel-serial converted by means of additional incorporated optical time delay elements, which ensure the bit interlacing of the data streams (bit-interleaved).

4 Claims, 4 Drawing Sheets

OTHER PUBLICATIONS

Patent Abstracts of Japan vol. 01, No. 2277 (E–640) 30, Juli 1988 & JP–A–63 056 027 (Toshiba) 26. Aug. 1986.

Journal of Lightwave Technology Bd. 6, Nr. 11, 1. Nov. 1988, New York US Seiten 1737–1749 Rodney S. Tucker et al. 'Optical Time–Division Multiplexing for a Very High Bit–Rate Transmission' Seite 1738, Spalte 2, Zeile 14—Seite 1739 etc.

Electronics Letters. Bd. 27, Nr. 11, 23, Mai 1991, Stevenage GB Seiten 973–974 G. E. Wickens et al. '20 GBIT/S, 205 KM Optical Time Division Multiplexed Transmission System'.

IEEE Photonics Technology Letters, Bd. 4, Nr. 6,1 Jun. 1992, New York US, Seiten 641–644. Masahiko Jinno '49. Gbit/s Electrooptic demultiplexing using cascaded on/off gates. 641'.

"16 Gbit/s Fiber Transmission Experiment using Optical Time–Division Multiplexing" by R. S. Tucker et al, Electronics Letters, 1987, vol. 23, No. 24, pp. 1270 and 1271.

"Photonic Switching Technologies", by K. Yukimatus et al, NTT Review, 1991, vol. 3, No. 2, pp. 98–101.

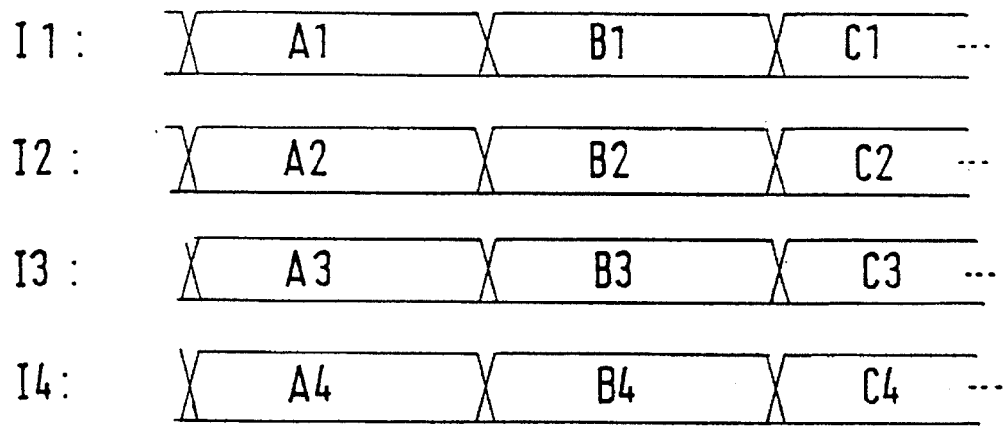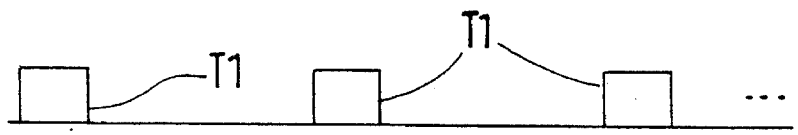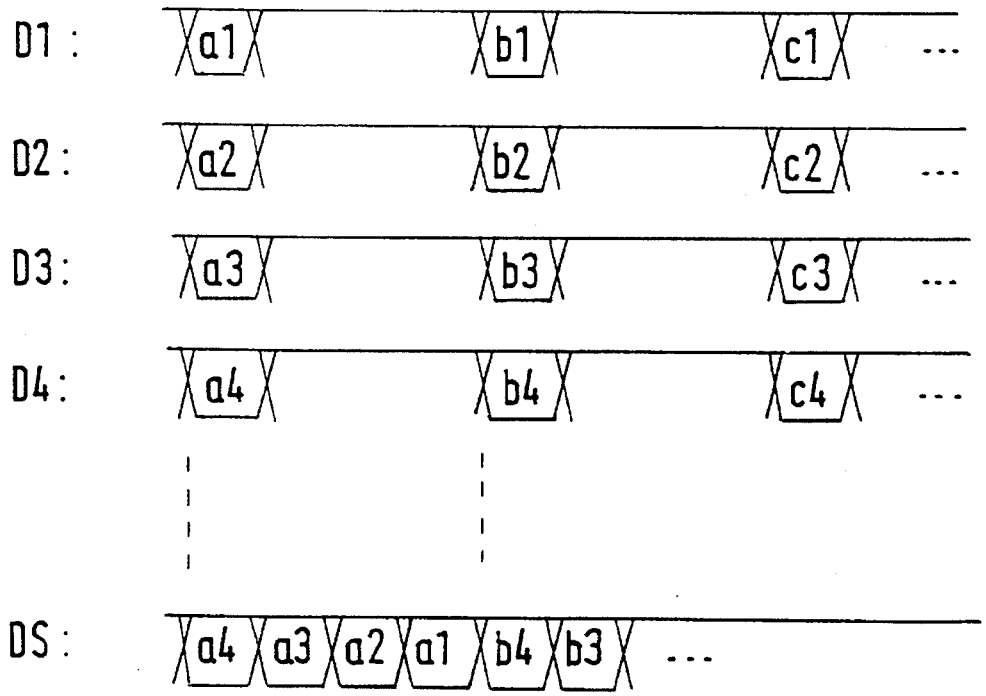
FIG.4

OPTICAL PARALLEL-SERIAL CONVERTER AND OPTICAL SERIAL-PARALLEL CONVERTER

This application is a continuation of application(s) Ser. No. 08/046,773 filed on Apr. 13, 1993, now abandoned.

TECHNICAL FIELD

The invention concerns a device for parallel-serial conversion of N synchronous data streams.

BACKGROUND OF THE INVENTION

The use of optical transmission paths is preferred in large telecommunication networks, because of their special quality characteristics, such as e.g. high transmission capacity, low damping and no crosstalk. Several subscriber connections are routed through an optical transmission path (optical waveguide), e.g. by the frequency multiplex process or the time multiplex process.

The article "16 Gbit/s Fibre Transmission Experiment using Optical Time-Division Multiplexing" by R. S. Tucker et al., published in "Electronics Letters", 1987, Vol. 23, No. 24 on pages 1270 and 1271, documents an optical time multiplex system. In it, four parallel electrical data streams are converted by optical senders and Ti:Li Nb 03 modulators into four parallel optical data pulse streams. The optical senders are time-displacement-controlled by electrical time delay elements (quarter bit-period time delays) in such a way, that the parallel optical data pulse streams are converted without overlapping into an optical waveguide in a space multiplex stage (MUX). The recovery of the four electrical data streams at the end of the optical waveguide is done by means of a demultiplexer stage (DEMUX), which contains cascaded optical directional coupler switches. Four optical receivers are installed downstream of the demultiplexer stage.

The introduced optical time multiplex system is self-contained. The conversion of the electrical data streams by means of transmitter-switching and receiver-switching to the optical waveguide takes place at its beginning or its end.

It is not possible to integrate the transmitter-switching and the receiver-switching into any section of a given optical transmission path.

It should also be possible to attach as many data sources and data outputs as possible to an optical transmission path, when they are located individually or in groups in different sections of the transmission path. This problem occurs particularly in ring structure transmission systems or in large scale switching networks, such as ATM systems. The publication "NTT Review", 1991, Vol. 3, No. 2, on pages 98-101 of the article "Photonic Switching Technologies . . . " by K. Yukimatsu et al., introduces a high speed optical ATM network with a transmission speed of about 1 Tbit/s.

In it, the ATM cells of several parallel data inputs are compressed in time and then are interlaced without overlapping and transmitted through an optical time multiplex path.

At the end, the compressed ATM cells are assigned to parallel data outputs by means of cell selectors, and are expanded in time to their original form by means of cell buffers. The article does not provide sufficiently clear technology, particularly in the depiction of the "cell" elements, in which inconsistencies between text and drawing occur. Still, it can be seen in principle that the transmission of data takes place in cells in the time multiplex process, and that neither the transmitter-switching on the input side, nor the receiver-switching on the output side, can be integrated into any section of a given optical transmission path.

SUMMARY OF THE INVENTION

The present invention has the task of coupling and uncoupling several synchronous data streams into or out of any section of an optical transmission path.

The task is fulfilled by the invention with a device for converting N synchronous data streams having a constant data pulse width from parallel to serial form for injection into an optical communication link by means of the following functionally cooperating elements; N optical modulators contained in the optical communication link; each of the optical modulators controlled by one of the data streams via a switching dement; the switching elements having means for reducing the data pulse width to a time interval which is not greater than the Nth fraction of the data pulse width so that the data stream is converted into a data sequence of short optical pulses for injection into the optical communication link, and each of the optical modulators is followed by one of at least N-1 optical delay elements which ensure nonoverlapping serial injection of the short optical pulses into the optical communication link.

It is also fulfilled by a device for converting a serial data stream to N parallel data streams, said serial data stream representing a bit-interleaved arrangement of the N parallel data streams and being carried on an optical communication link by means of the following functionally cooperating elements; at least one optical branching element contained in the optical communication link, so that N optical branches diverge therefrom; each of N optical modulators each followed by a pulse stretcher that is coupled to a respective one of the optical branches, and N-1 optical delay elements each connected to a respective one of the optical branching elements to ensure a parallel selection of the N data streams from the serial data stream by means of the optical modulators.

Thus, with respect to the first mentioned device, the data streams are routed by means of parallel-serial conversion to an optical transmission path. Essentially, the parallel-serial conversion takes place with optical modulators and optical time delay elements, which operate together in such a way, that the insertion of N data streams occurs in accordance with a shift register with N parallel inputs.

The optical modulators form the light in the optical transmission path (optical signal carrier) as a function of the data streams. Accordingly the device in claim 1 can also be understood to be an optical shift register with N parallel inputs, one serial optical input and one serial optical output. Depending on the modulator control, the parallel data streams can be both electrical and optical in nature. The device can be integrated into any section of an optical transmission path, because the coupling of the data streams takes place without the aid of additional optical transmitters, rather it takes place by means of optical modulators. Thus, in principle, no interruption of the optical transmission path is taking place.

With respect to the second mentioned device, the N data streams are recovered by serial-parallel conversion of one serial data stream passing through the optical transmission path. The serial-parallel conversion essentially takes place by means of optical expanders and optical time delay elements, which make parallel decoupling of the N data streams from the optical transmission path possible. Accordingly, and analogously to the latter argument, the device can also be understood to be an optical shift register with N parallel outputs, one optical serial input and one optical serial output.

This device can also be integrated into any section of an optical transmission path, since the optical expanders do not represent any interruption of the optical transmission path, in principle.

With respect to the first mentioned device, it can be coupled by means of the modulators into any section of the optical transmission path, which can, for example, represent a high speed optical waveguide ting. The optical transmission path already contains intermittent optical data pulses, such as can occur in asynchronous packet switching systems. The device is therefore a technical variation in the manner of a switchable drop-in multiplexer. Thus, data streams can be advantageously coupled into any section of the optical waveguide ring during time intervals in which no packet traffic takes place.

The device can also be constructed in accordance with a type of multiplex transmitter. The optical transmission path is supplied with a constant light (optical carrier), which is formed by the optical modulators at the beginning. The constant light is emitted by a semiconductor laser, for example, and is coupled into an optical waveguide, after modulation.

BRIEF DESCRIPTION OF THE DRAWINGS

The following explains the invention in more detail, by referring to configuration examples, and by means of the enclosed drawings.

FIG. 4 shows pulse-time diagrams with respect to the parallel-serial conversion.

BEST MODE FOR CARRYING OUT THE INVENTION

Figure 1:
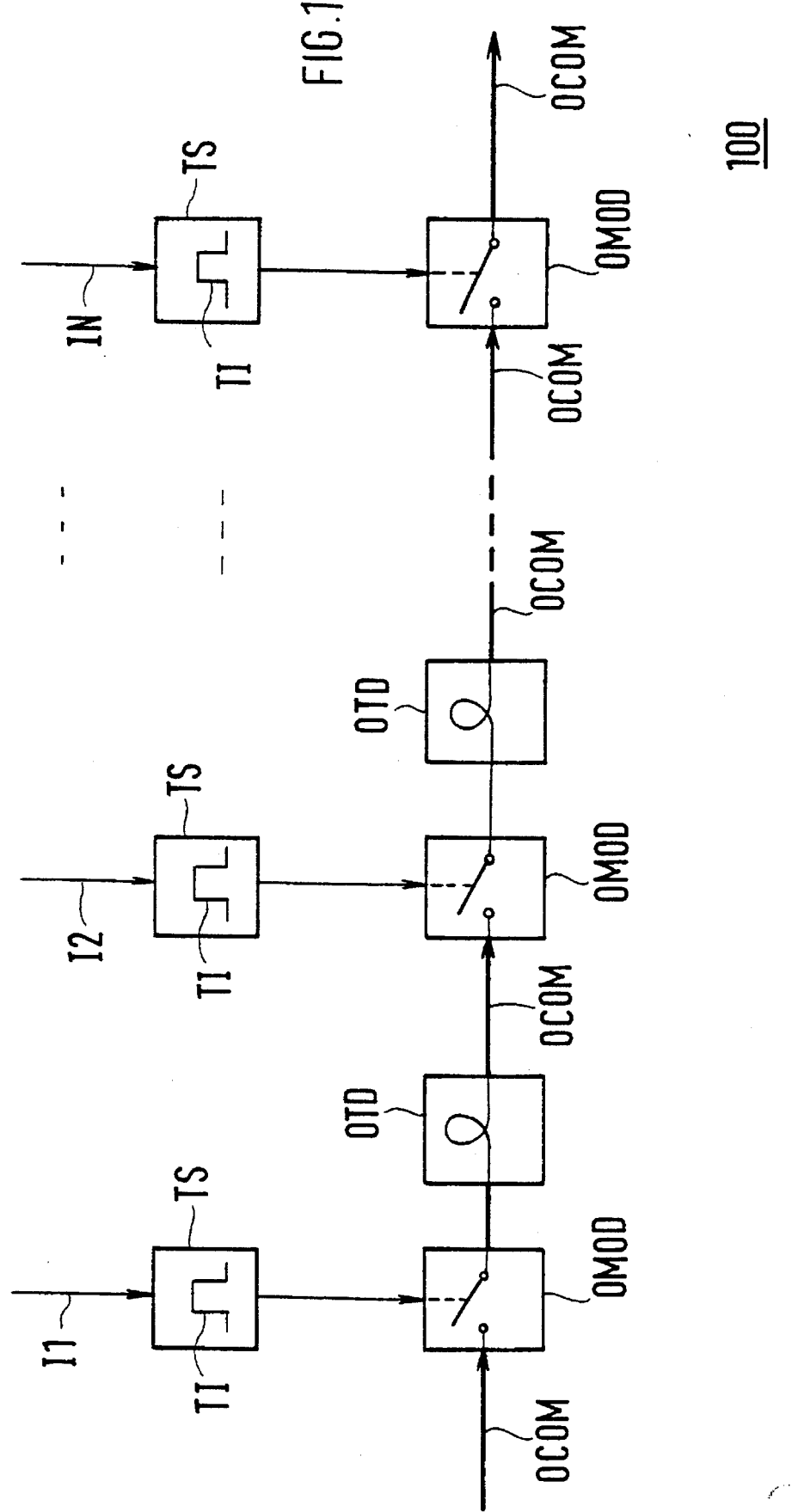
FIG. 1 shows a device according to an optical, switchable drop-in multiplexer.

The circuit in FIG. 1 contains N optical modulators OMOD, which are represented by Ti:Li Nb 03 switches with an electrical control input each.

Also shown are N-1 optical time delay elements OTD, each of which consists of an optical waveguide loop with a predetermined signal running time, and N electrical switching elements TS, each consisting of a logic AND-gate, controlled by one of the data streams and one asymmetrical timing signal with a switch time interval TI.

Starting with one of the optical modulators, these and the optical time delay elements are switched on alternately and are thereby integrated in series into a section of an optical waveguide OCOM. Each optical modulator forms a switching unit, in conjunction with the coupled electrical switching element and the optical time delay element connected downstream of the modulator.

Inserting other such basic units into the above described series circuit makes a modular expansion of the circuit in FIG. 1 possible. The now constant signal running times of the optical waveguide loops are added into a total delay time. This is not longer than the Nth part of the (N−1)th time of the constant data pulse width of the synchronous data streams. The switching time interval is not longer than the signal running time.

The above determinations and a blank control of the optical modulators ensure the use of the device in FIG. 1 as a switchable time multiplex stage. This is described more concretely below for the instance of a coupling of four synchronous data streams (N=4), where FIG. 4 is also referenced.

Each of the four data streams I1, . . . , I4 represents an electrical ATM signal, which has a constant data pulse width PW of 7.1 ns e.g., (corresponding to a transmission speed of 140 Mbit/s). The four data streams are synchronous to each other, and each is routed to a switching element. This consists of a logic AND-gate with an input for the respective data stream and a second input for a timing signal.

Synchronously with data streams, the timing signal contains a timing pulse with a time interval TI, which corresponds to the fourth part of the data pulse width. This blanks out the respective data pulses Ax, Bx, Cx, . . . of the ATM signals down to the fourth part of the original data pulse width PW.

In each case, one optical Ti:Li Nb 03 switch that is controllable in inverse logic (active low) converts the shortened electrical data pulses into respectively short optical pulses D1, . . . , D4, in the partial section of an optical ATM high speed optical waveguide ring OCOM. The latter operates in a blank (dark) cycle process and the above partial section is idle, i.e. contains constant light.

The short optical pulses D1, . . . , D4 are successively delayed by three, two, one and zero time intervals TI by means of the optical waveguide loop OTD, and successively converted, without overlapping, into the optical waveguide OCOM. With a transmission speed of 560 Mbits (=4×140 Mbit/s), the latter contains a serial data stream DS, which represents the serial interlacing of the four parallel data streams I1, . . . , I4 in the time multiplex process. As described above, a coupling of the parallel data streams into the partial section of the optical waveguide ring only takes place when the latter contains no (ring) data signals. To that effect, an optical detector (e.g. avalanche- photodiode) connected upstream of the device, determines time gaps in the ring data traffic, which are used to activate the coupling of the parallel data streams. The device according to FIG. 1 can therefore be understood to be a switchable time multiplex stage (drop-in multiplexer).

In accordance with the invention, it can be integrated into any section of the optical waveguide. In the same way, the device in FIG. 1 can be used as an optical time multiplex transmitter by coupling it to the beginning of the optical waveguide. No optical transmitters, such as laser or light emitting diodes, are required.

The device can be expanded to advantage because of its modular construction. By varying the length of individual optical waveguide loops OTD, a parallel-serial conversion can take place without overlapping, even if the distance between the optical modulators OMOD is not the same (input points of data streams I1, . . . , I4). This applies to locally far removed, but simultaneously routed data streams.

The device in FIG. 1 is also suitable for coupling bus-conducted data items, where each of the inputs I1, . . . , IN corresponds to a bit place in the data item. The series connection of the optical modulators can be used to advantage to establish the priority of the bit places, by assigning the bit places of the data item to the respective inputs I1 to IN from the highest value bit place (MSB: most significant bit) to the lowest value bit place (LSB: least significant bit).

Figure 2:
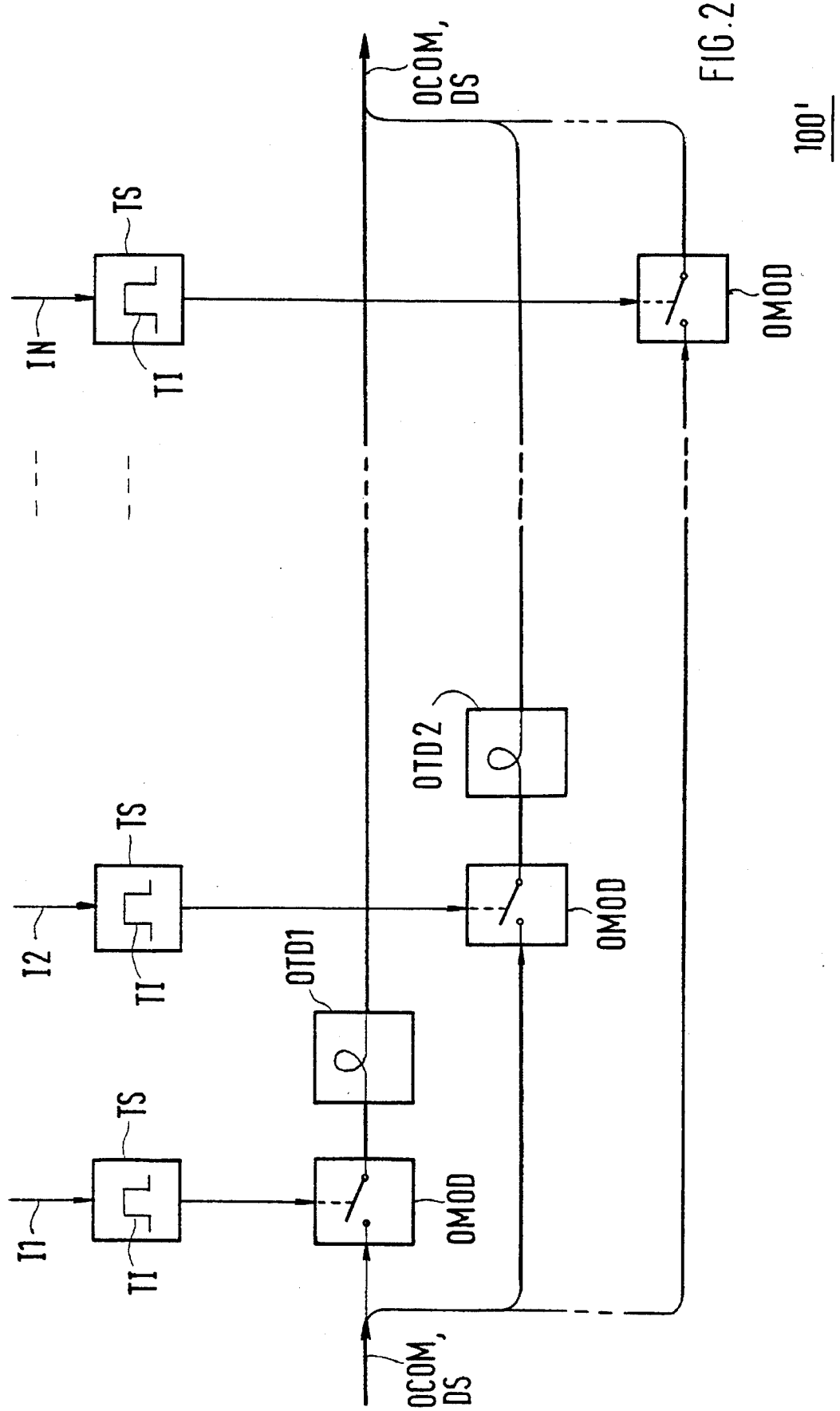
FIG. 2 shows a device according to an optical multiplex transmitter.

The following describes the configuration of the invention as shown in FIG. 2. It contains N Ti:Li Nb 03 switches OTDM, each with one electrical control input, These are N-1 optical waveguide loops OTD1, OTD2, ... for the optical time delay, and N electrical switching elements TS, each consisting of a logic AND-gate.

Analogously to the data streams I1, ..., IN and the pulses occurring in the circuit according to FIG. 1, the device in FIG. 2 has equal value signals, as shown in FIG. 4.

The displacement in time of the optical impulses, which are interlaced with each other for the serial data stream DS, is produced in this instance by different optical time delay elements OTD1, OTD2, .... Their delay times differ from each other by the respective switching time interval TI.

Separating the optical waveguide OCOM into N optical partial branches produces a separate, independent optical modulation, which takes place through bright-keyed optical Ti:Li Nb 03 switches. The optical impulses, which are produced in each partial branch and displaced in time, are routed to the optical waveguide by means of an optical connector.

The parallel structure of the circuit assembly permits a modular expansion of the device. In this instance, all partial branches have equal rights with respect to the signal technology, which contributes to the high operational reliability of the device. Thus, individual modulator controls may be omitted, i.e. the optical switch stays in the idle position and remains open, without impairing the operation of the entire circuit.

The device described in FIG. 2 represents an optical time multiplex transmitter. It is supplied with constant light by the optical waveguide.

However, a control unit also permits installation of a bright-keyed drop-in multiplexer into an optical waveguide ring. In that instance, the control unit must exclusively switch optically to a partial branch during ring data traffic.

Figure 3:
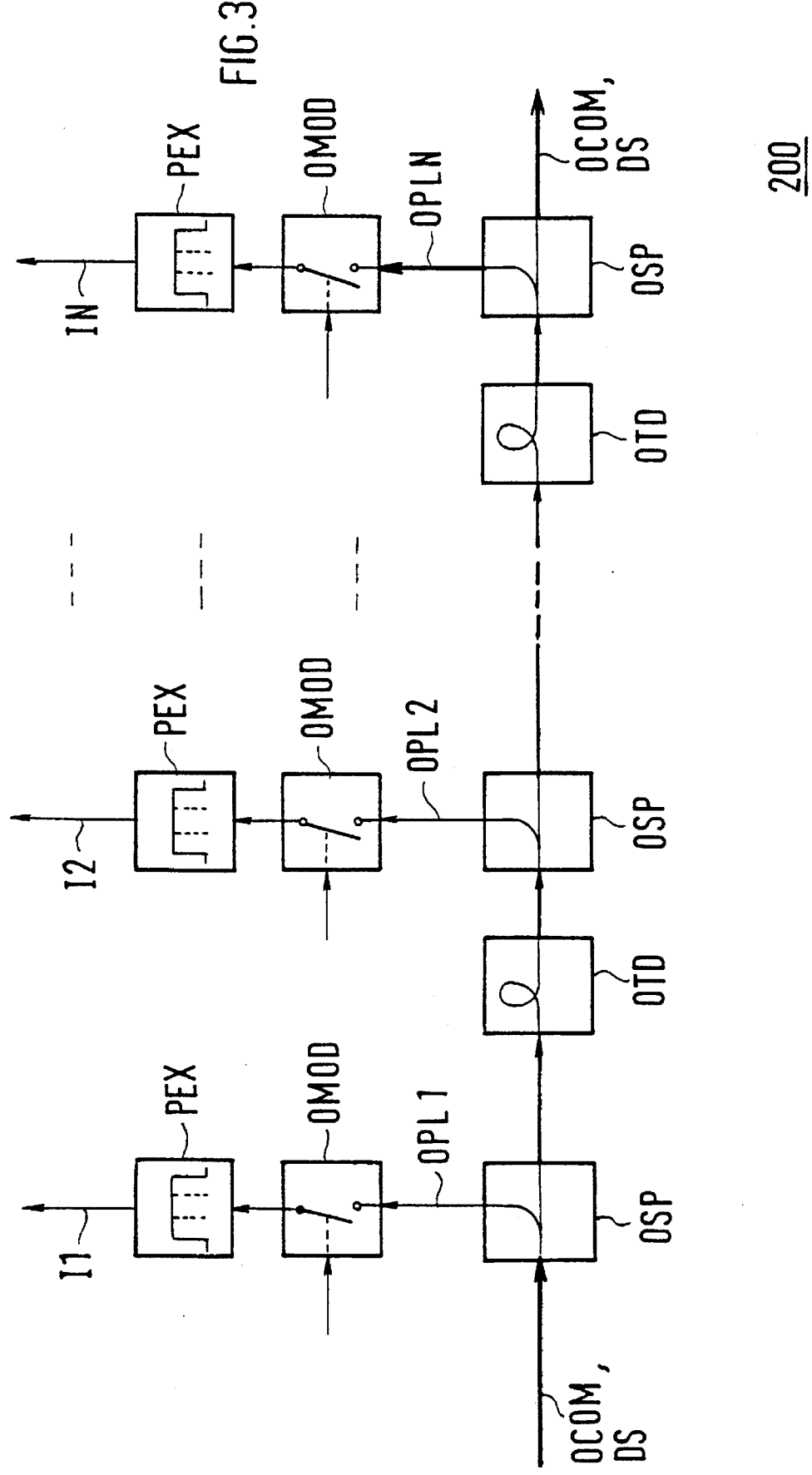
FIG. 3 shows a device according to an optical, switchable drop-out multiplexer.

The circuit depicted in FIG. 3 must be understood as a technical equal to the devices in FIGS. 1 and 2. It permits a serial-parallel conversion in accordance with the invention, from a serial data stream DS into N data streams I1, ..., IN.

The series connection of N optical expanders OSP causes the serial data stream to be divided N-times from an optical waveguide into the respective optical partial branch OPL1, ..., OPLN. From the second to the Nth optical expander, each has an optical waveguide loop OTD connected upstream as an optical time delay element.

The serial data stream, which consists of optical pulses of the time period TI, is delayed in the optical waveguide loop by the time period TI, and is thereby time displaced and diverted to the optical partial branches.

The optical switches OMOD, which are integrated into the partial branches, are simultaneously controlled, so that they switch during a time period TI, and then are open for the time period N-1.

By synchronizing the cycle with the serial data stream DS, a sequence of optical pulses is obtained at the respective outputs of the optical switches, from which the serial data stream is formed by interlacing in accordance with the time multiplex process. The individual pulses are expanded in time by the optical pulse expansion elements PEX to the data pulse width PW, which corresponds to the N-times time period TI.

Each of the optical pulse expansion elements consists of an optical expander, N optical waveguide loops and an optical connector. One input pulse of the pulse expansion element is branched in parallel to the optical waveguide loops, which delays it by 1-time up to N-times the time period TI. The optical connector joins the time displaced partial pulses into a total pulse with a pulse width PW, and guides it to the output of the pulse expansion element.

Accordingly, N optical data streams are diverted to the outputs of the pulse expansion elements, which correspond to the data streams I1, ..., IN supplied to the devices in FIGS. 1 or 2.

The device in FIG. 3 can be used both inside an optical waveguide ring as a switchable, optical time multiplex receiver, and at the end of an optical waveguide as a final time multiplex receiver.

I claim:

1. An apparatus (100, 100') for converting N synchronous data streams (I1, I2, ..., IN) having a constant data pulse width (PW) from parallel to serial form for injection into an optical communication link (OCOM) by means of the following functionally cooperating elements:

(1) N optical modulators (OMOD) contained in the optical communication link (OCOM);

(2) each of the N optical modulators (OMOD) being controlled by one of the N synchronous data streams (I1, I2, ..., IN) via a respective switching element (TS);

(3) each of the respective switching element (TS) being clocked by a synchronous timing signal having a timing pulse with a timing interval (TI) for reducing the constant data pulse width (PW) to the time interval (TI) which is not greater than the Nth fraction of the constant data pulse width;

(4) so that the N synchronous data streams are, according to (2) and (3), converted into a serial data sequence (Dn) of short optical pulses (D1, D2, ..., D4) for injection into the optical communication link (OCOM), and (5) each of the N optical modulators (OMOD) is followed by one of at least N-1 optical delay elements (OTD; OTD1, OTD2, ...) which ensure nonoverlapping serial injection of the short optical pulses (D1, D2, ..., D4) into the optical communication link (OCOM).

2. An apparatus as claimed in claim 1, characterized in that the N optical modulators (OMOD) are contained in an arbitrary section of the optical communication link (OCOM), which already carries optical data pulses at times, and that the parallel-to-serial conversion takes place when no optical data pulses are being carried.

3. An apparatus as claimed in claim 1, characterized in that the N optical modulators (OMOD) are contained in that initial section of the optical communication link (OCOM) which is coupled to a steady light source.

4. An apparatus (200) for converting a serial data stream (DS) to N parallel data streams (I1, I2, ..., IN), said serial data stream (DS) representing a bit-interleaving arrangement of the N parallel data streams (I1, I2, ..., IN) and being carried on an optical communication link (OCOM), by means of the following functionally cooperating elements:

(1) at least one optical branching element (OSP) contained in the optical communication link, so that N optical branches (OPL1, OPL2, ..., OPLN) diverge therefrom;

(2) each of N optical modulators (OMOD) each followed by a pulse stretcher (PEX) that is coupled to a respective one of the optical branches, each of the N optical modulators (OMOD) being clocked by a synchronous timing signal, and (3) N-1 optical delay elements (OTD) each connected to a respective one of the optical branching elements (OSP) to ensure a parallel selection of the N parallel data streams (I1, I2, ..., IN) from the serial data stream (DS) by means of the N optical modulators (OMOD).

* * * * *

UNITED STATES PATENT AND TRADEMARK OFFICE
CERTIFICATE OF CORRECTION

PATENT NO. : 5,535,032
DATED : Jul. 9, 1996
INVENTOR(S) : Bottle

It is certified that error appears in the above-indentified patent and that said Letters Patent is hereby corrected as shown below:

TITLE PAGE:

At INID [56], References Cited Line 35, delete "Electroptic" and insert --Electrooptic--.

Signed and Sealed this

First Day of October, 1996

Attest:

BRUCE LEHMAN

Attesting Officer        Commissioner of Patents and Trademarks